Inventor
JACOB RABINOW

April 14, 1964 J. RABINOW 3,129,424
DISTANCE RESPONSIVE DEVICE
Filed Aug. 5, 1949 2 Sheets-Sheet 2
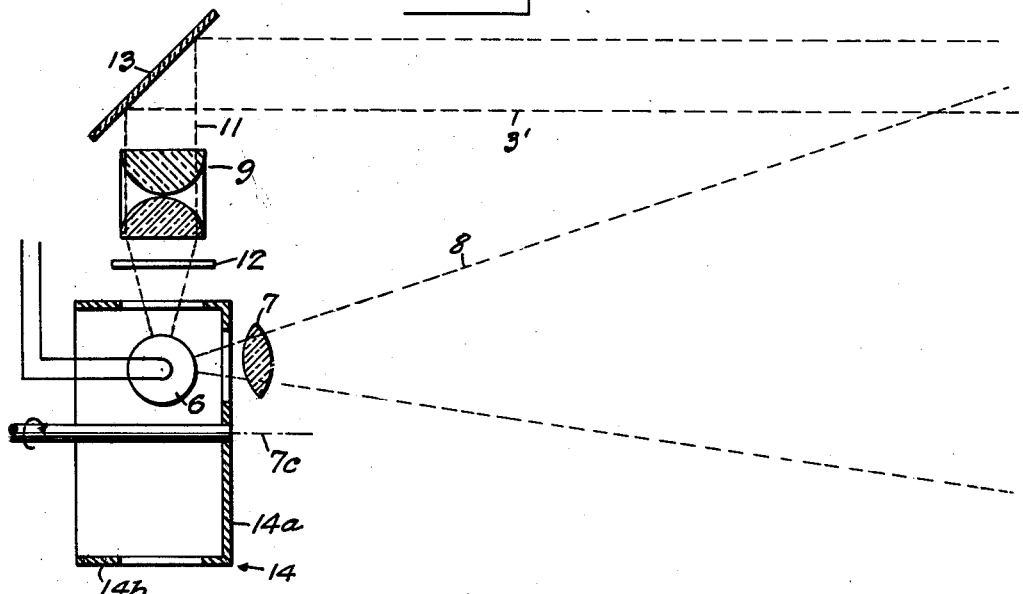
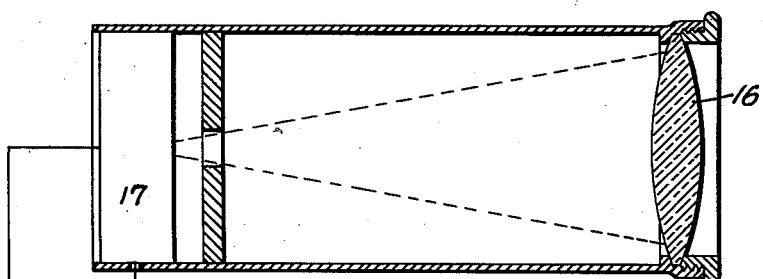
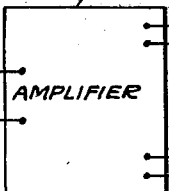
AMPLIFIER
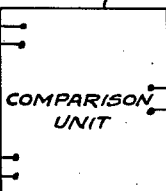
COMPARISON UNIT
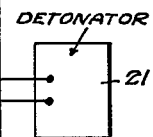
DETONATOR
Inventor
JACOB RABINOW

United States Patent Office 3,129,424
Patented Apr. 14, 1964

3,129,424
DISTANCE RESPONSIVE DEVICE
Jacob Rabinow, Takoma Park, Md., assignor to the United States of America as represented by the Secretary of the Army
Filed Aug. 5, 1949, Ser. No. 108,831
4 Claims. (Cl. 343—12)
(Granted under Title 35, U.S. Code (1952), sec. 266)

The invention described herein may be manufactured and used by or for the Government for governmental purposes without the payment of any royalty thereon.

My invention relates to distance responsive devices, and more particularly to a radiant energy device which will accurately give an indication of the distance to a reflecting object at relatively close range. Specifically the invention contemplates comparison of the reflection intensities of two beams of radiant energy (light waves, radio waves, etc.) which have different distance intensity characteristics, as an indication of the distance to a reflecting object.

It is a well known physical principle that, when a divering beam of radiant energy is transmitted from a source, the unit-area intensity of the beam is inversely proportional to the square of the distance which it has traveled.

When two such beams are transmitted, the distance between the apparent source of one beam and the target being greater than the distance between the apparent source of the second beam and the target, it is clear that the difference between the intensities of the two beams will vary as the target is caused to approach or recede from the two sources.

A single source may be used for the two beams under certain circumstances: e.g., if the beam is split into two portions, one of which is caused to pass through a collimating system (thus providing an apparent source at infinity) while the second portion is projected as a diverging beam, as when caused to pass through a simple lens of relatively short focal length.

This principle, employing a device, as hereinafter described, which projects two such beams of energy in such manner as to differentiate between the beams when they are reflected back from the target to a point near their source, and to compare the intensity of the two beams, may be utilized to measure distances between the source of energy and the reflecting surface or target. Such measurement will be unaffected by the reflecting properties of a relatively uniform target with any reflection coefficient greater than zero, for the same fraction of both beams will be reflected. This fact makes my device suitable to a great variety of applications in which the measurement of air distance is required. Two examples of this use are in proximity fuses for ordnance missiles and in altimeters for aerial navigation, but these examples are intended to be typical, and in no way to restrict other applications to which my device is suited. These two devices are described in order that the operation of my device shall be clear.

In the class of ordnance weapons known as proximity fuses, there are two major classes; active fuses, which emit a signal (e.g., a light beam or a radio wave) and are activated when such signal is reflected back from the target to reach the fuse in a certain manner; and passive fuses which detect the presence of a target by means of some emanation from the target (e.g., electrical noise, or heat) which reaches the fuse. My invention deals with the active type of fuse, and may be adapted to various types of fuse of this class. Two such types are the radio proximity fuse, wherein a radio signal transmitted by a portion of the fuse operates a detonator when reflected back to the fuse from the target, and the photoelectric fuse, wherein a light beam emitted by a portion of the fuse operates a detonator when reflected back to the fuse from the target.

My principle is applicable to either type of active fuse. For the sake of clarity, the operation of my principle as applied to a photoelectric fuse is hereinafter described. The principle involved in such fuse is that when two beams of light are emitted from a source, one being a collimated beam of a given intensity, and the other being a diverging beam of greater intensity, there will be a point at some specific distance from the source where the illumination of a unit area of a surface lighted by the first beam will be exactly equal to the illumination of a unit area of surface lighted by the second beam. In this disclosure, the use of one collimated and one diverging beam is described, but as has been heretofore asserted, it is possible to use two diverging beams when their apparent sources are at different distances from the target.

It is apparent that the same effect can be obtained when directed radio beams are used, originating at sources which are of differing apparent distances from the target. I shall, however, confine this disclosure to the photoelectric method, from which the operation of the radio method will be obvious to one skilled in the art.

The specific nature of the invention as well as other objects and advantages thereof will clearly appear from a description of a preferred embodiment as shown in the accompanying drawings, in which FIGURE 1 shows a typical external configuration of a photoelectric fuse which incorporates my principle.

FIGURE 2 is a schematic diagram of a simplified version of the transmitter portion of such fuse.

FIGURE 3 is a schematic diagram of a simplified version of the receiver portion of such fuse.

Figure 1:
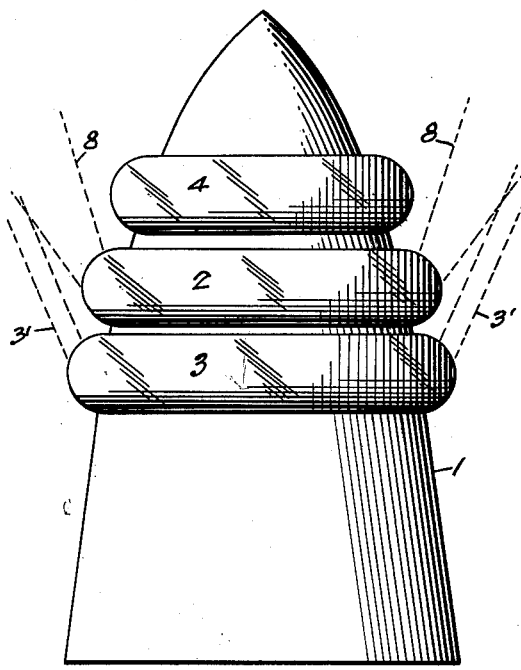

In FIGURE 1, the body of the fuse is indicated at 1. This body is provided with three annular lenses. A beam of parallel light rays, modulated at a frequency which for the purpose of this disclosure shall be termed the "A" frequency, is projected through lens 2. A second beam of divergent light rays, of greater intensity at the source than the previously mentioned beam and modulated at a different (or "B") frequency, is projected through lens 3. When the projected light beams strike a target, they are reflected back to the fuse, which they enter through lens 4. The action which takes place to secure the desired projection and utilization of the reflection is described in detail in the following paragraphs.

FIGURE 2 illustrates one specific construction of the transmitting portion of the fuse. This portion includes a light source 6 which is powered from a suitable source (not shown) such as a primary or secondary battery, a wind-driven generator, etc. A portion of the light emitted by this source is caused to pass through a lens system 7 in such manner that a divergent beam 8 is produced. A second portion of the light from the source is caused to pass through a collimating lens system 9 in such manner that a relatively parallel beam 11 is produced. In order that the parallel beam shall be of lesser unit intensity at unit width than is the parallel beam a neutral filter 12 or some similar component is provided preferably adjacent to the source. A mirror 13 directs the beam 11 along a path virtually coincident with that of beam 3'. For use in a proximity fuse the lenses may be annular, corresponding to lenses 2 and 3 of FIGURE 1, arranged to project annular beams or cones of light at a predetermined forward angle.

As has been previously explained, the use of a collimating lens system 9 is one of several acceptable methods; the use of lenses of relatively widely differing focal lengths at 7 and 9 will produce an equivalent result. Furthermore, the use of the neutral filter 12 is desirable but not essential; compensation for equal source intensity may be obtained by utilizing differing degrees of amplification in the two bands of the amplifier which is subsequently discussed.

Figure 4:
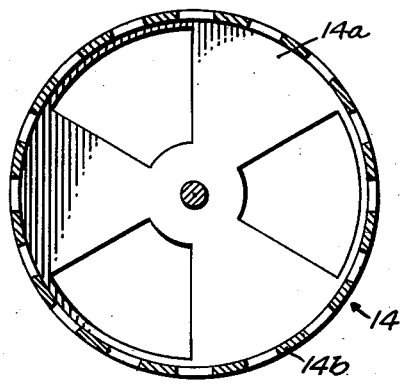
FIGURE 4 is a top view of a light interrupting rotary shutter for use in my invention.
Figure 5:
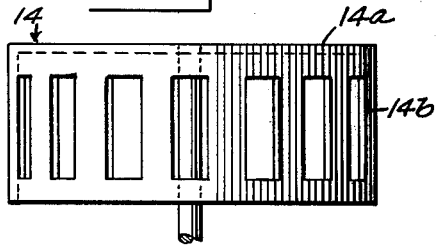
FIGURE 5 is a side view of the same shutter.

Interposed in the beam is a "chopper" 14 mounted for rotation about axis 7c which periodically interrupts and thus modulates the beams which pass through lenses 7 and 9, each beam being modulated at a different frequency. For example, the surface of the chopper 14a may be divided into six portions, as shown in FIGURE 4, three of such portions being apertures and the remaining three portions being left opaque, while the periphery of the chopper 14b may be divided into 32 portions, as shown in FIGURE 5, half of which are apertures, the remaining sixteen being opaque. This will provide modulation of both beams when the chopper is rotated; for example, if rotation is at 6000 r.p.m. (or 100 r.p.s.) a 300 c.p.s. modulation will be obtained in the diverging beam while a 1600 c.p.s. modulation will be obtained in the parallel beam. These frequencies are cited as an example, and it is in no way intended to limit my invention to these or to any other frequencies. For convenience in reference, the lower frequency will hereafter be termed the "A" frequency and the higher frequency the "B" frequency, irrespective of the number of cycles per second in either frequency.

From the foregoing description, it should be apparent that, through the use of a light source, appropriate lenses, a filter and a chopper, there will be transmitted two beams of light, from sources of different apparent distances from the target, and that one of these beams will be modulated at a certain frequency, while the other beam will be modulated at a second frequency. These two beams are so directed that their axes are virtually coincident.

In order to utilize these transmitted beams to operate an ordnance fuse, a receiving circuit is also employed as shown in FIGURE 3. Light reflected from the target is collected by a lens 16 which includes approximately the angle of the narrower of the two beams, and is focused into a photoelectric cell 17, the output of which is fed to an amplifier 18 which includes two band-pass filters. One of these filters is designed to pass only the "A" frequency; the other filter is designed to pass only the "B" frequency.

The output of the amplifier is fed to a comparison circuit 19, which may be of any type well known to the art. This circuit is so designed that a voltage sufficient to operate the detonator 21 appears at its output when, and only when, the amplitude of the "A" frequency signal bears a predetermined relationship to the amplitude of the "B" frequency signal, as will be shown below.

As previously mentioned, it is practicable but not essential in the design of my apparatus that the device shall operate when both the "A" and the "B" beams shall be received with the same intensity. Design may be such that function will be had when either beam is received with an intensity differing from that of the other beam by a predetermined amount. This is a mere detail of circuitry apparent to those conversant with the art.

The operation of my fuse at a previously determined distance from the target will be more readily understood from the following explanation of a circuit of certain construction. The receiving lens (16 in FIGURE 3) is oriented in such manner that its field of view coincides approximately with the parallel beam from the transmitter; therefore the energy transmitted to the photocell from the reflected parallel beam will vary approximately as the square of the distance from the reflecting surface to the receiving lens. But the energy transmitted to the photocell from the more diverging beam will vary approximately as the fourth power of the distance from the reflecting surface to the receiving lens. As the divergent beam is, in the case described, made more powerful at the source than the parallel beam, there is obviously some distance at which the two energies reflected to and received by the receiving lens will be equal. The circuits hereinbefore described will cause the fuse to detonate the missile at this point.

Figure 6:
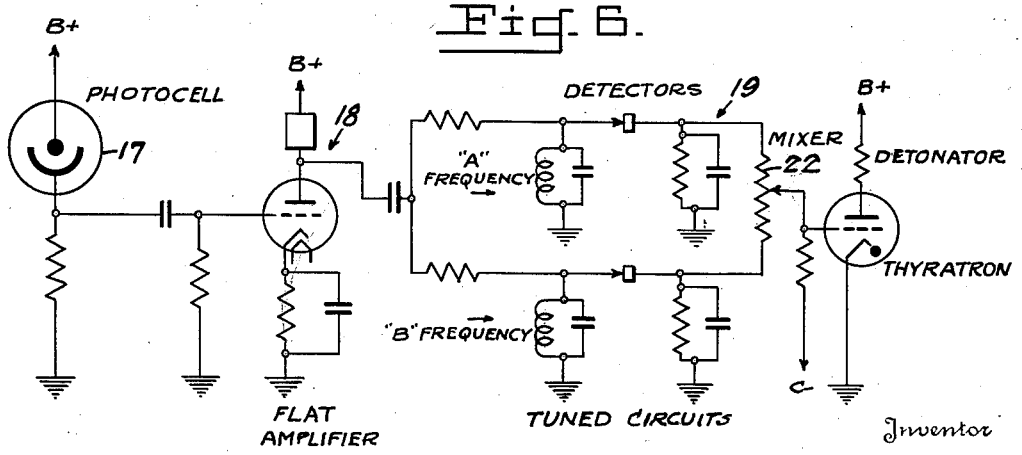
FIGURE 6 is a schematic diagram exemplifying the circuits used in my invention.

In FIGURE 6, photocell 17 is shown with its output feeding amplifier 18, shown as a conventional single-stage flat amplifier, the amplified output being fed to comparison unit 19 consisting of two tuned circuits responsive to the respective frequencies of the two interrupted beams, and means for balancing the detected and filtered outputs against each other in any desired proportion to secure actuation of the relay (in this case indicated as a thyratron) at any desired ratio of intensity the two reflected beams. The circuit shown is purely schematic, as the design of a selective circuit for the purpose is a matter of ordinary skill. I show a mixer potentiometer 22 for securing the desired ratio of intensities, but the point of detonation can be controlled in a number of other ways.

One method consists of varying the relative illumination of the two beams; this may, for example, be done by selecting any of a variety of filters to be placed in the darker beam, or by using separate sources for the two beams, one being brighter than the other. Another method consists of controlling the position of the apparent sources of divergent beams; this may be done by selecting lenses with differing characteristics and arranging the optical geometry accordingly. In general, any variation of the parameters which affects the relative intensities of the received signal as it may be employed.

The principle heretofore described in connection with the use of my device in a proximity fuse applies equally well to its use as an altimeter. Referring again to FIGURE 3, the comparator circuit 19 and the detonator 21 are omitted. The "A" and "B" frequencies may then be fed to a pair of indicating devices, such as meters, which show the relative intensity of the two received beams. The relationship of these values will indicate the distance from the transmitter and the receiver to the target, in this case the surface of the earth. Alternatively, a coordinating circuit may be used at 21; when the device is so designed that the intensity of one beam is greater per unit area at all significant distances, the amount by which the intensity of this beam exceeds the other at any distance will vary with the distance. Thus it is apparent that an indicating device which shows the amount of this excess and the variation therein can be calibrated to read directly in increments of altitude.

It will be understood that the use of a chopper to modulate the two beams at different frequencies is by way of example only. I could use instead two beams of different initial frequencies, or of different colors (in the case where visible light is used) together with suitable filters for separating the two beams for comparison when received.

It will be apparent that the embodiment shown is only exemplary and that various modifications can be made in construction and arrangement within the scope of my invention as defined in the appended claims.

I claim:

1. A distance-responsive device comprising in combination: a source of radiant energy; means for projecting from said source first and second separate overlapping beams modulated at first and second frequencies; a receiving lens which collects reflected radiant energy from both of said first and second beams; a photoelectric cell upon which said lens focuses the reflected energy; an amplifier to which the output of said photoelectric cell is fed, said amplifier having first and second band-pass filters, said first filter being designed to pass energy of said first frequency and said second filter being designed to pass energy of said second frequency; and a comparison circuit to which the outputs of said first and second band-pass filters are fed, said comparison circuit determining distance by the relationship between the outputs of said first and second band-pass filters.

2. A distance responsive device comprising in combination: a light source; first and second lens systems through which portions of light from said light source are passed, said first lens system producing a divergent beam and said second lens system producing a parallel beam of lesser intensity than said divergent beam; a mirror to direct said parallel beam along a path coincident with said divergent beam; rotating chopper means interposed between said light source and said first and second lens systems to modulate said divergent and parallel beams at first and second frequencies respectively; a receiving lens which collects reflected light from both of said divergent and parallel beams; a photoelectric cell upon which said receiving lens focuses the reflected light; an amplifier to which the output of said photoelectric cell is fed, said amplifier having first and second band-pass filters, said first filter being designed to pass energy of said first frequency and said second filter being designed to pass energy of said second frequency; and a comparison circuit to which the outputs of said first and second band-pass filters are fed, said comparison circuit determining distance by the relationship between the outputs of said first and second band-pass filters.

3. An ordnance proximity fuze comprising in combination: a fuze body; a light source; first and second annular lenses mounted around said fuze body through which portions of light from said light source are passed, said first lens producing a first beam and said second lens producing a second beam, said first and second beams having sources which appear to be at different distances from a target, said first beam appearing to be at a larger distance than said second beam; a mirror to direct said first beam along a path coincident with said second beam; chopping means interposed between said light source and said first and second annular lenses to modulate said first and second beams at first and second frequencies respectively; a third annular lens mounted around said fuze body and serving as a receiving lens to collect reflected light from the target, said third lens including the angle of said first beam; a photoelectric cell upon which said third lens focuses the reflected light; an amplifier to which the output of said photoelectric cell is fed, said amplifier having first and second band-pass filters, said first filter being designed to pass energy of said first frequency and said second filter being designed to pass energy of said second frequency; a comparison circuit to which the outputs of said first and second filters ars fed; a thyratron firing circuit to which the output of said comparison circuit is fed, said comparison circuit applying a firing pulse to said thyratron when the outputs from said filters have a predetermined relationship; and a detonator connected in said thyratron circuit which is activated by the firing of said thyratron.

4. An ordnace proximity fuze comprising in combination: a fuze body; a light source; first and second annular lenses mounted around said fuze body through which portions of light from said light source are passed, said first lens producing a parallel beam and said second lens producing a divergent beam; a neutral filter interposed between said light source and said first lens, said neutral filter reducing the intensity of the light applied to said first lens so that said parallel beam is of lesser intensity than said divergent beam; a mirror to direct said parallel beam along a path coincident with said divergent beam; a chopping means interposed between said light source and said first and second annular lenses to modulate said parallel and divergent beams at first and second frequencies respectively; a third annular lens mounted around said fuze body and serving as a receiving lens to collect reflected light from the target; said third lens being oriented so that its field of view coincides approximately with said parallel beam; a photoelectric cell upon which said third lens focuses the reflected light; a single-stage flat amplifier to which the output of said photoelectric cell is fed; a comparison unit to which the output of said amplifier is fed, said comparison unit comprising two tuned circuits responsive to said first and second frequencies of said parallel and divergent beams respectively and means for balancing the outputs of said tuned circuits in any desired proportion; a thyratron to which the output of said means are fed, said means applying a firing voltage to said thyratron when the outputs of said tuned circuits have a predetermined relationship; and a detonator connected in said thyratron circuit which is activated by the firing of said thyratron.

References Cited in the file of this patent
UNITED STATES PATENTS

| | | |
|---|---|---|
| 2,137,598 | Vos | Nov. 22, 1938 |
| 2,206,036 | Herson | July 2, 1940 |